United States Patent [19]

Kobayashi et al.

[11] Patent Number: 5,086,511
[45] Date of Patent: Feb. 4, 1992

[54] MOBILE RECEIVER

[75] Inventors: Akikazu Kobayashi, Yokohama; Hideo Shiozawa, Sagamihara, both of Japan

[73] Assignee: Matsushita Electric Industrial Co., Ltd., Osaka, Japan

[21] Appl. No.: 490,419

[22] Filed: Mar. 8, 1990

[30] Foreign Application Priority Data

Mar. 13, 1989 [JP] Japan .................................. 1-059930
Mar. 13, 1989 [JP] Japan .................................. 1-059931

[51] Int. Cl.⁵ ............................................. H04B 11/16
[52] U.S. Cl. ..................................... 455/156; 455/186
[58] Field of Search ............... 455/158, 161, 184, 186, 455/157, 52, 156, 154, 166, 345

[56] References Cited

U.S. PATENT DOCUMENTS

| 4,641,367 | 2/1987 | Van Deursen | 455/186 |
| 4,862,513 | 8/1989 | Bragas | 455/345 |
| 4,962,544 | 10/1990 | Igari | 455/186 |
| 4,969,209 | 11/1990 | Schwob | 455/186 |

Primary Examiner—Curtis Kuntz
Attorney, Agent, or Firm—Stevens, Davis, Miller & Mosher

[57] ABSTRACT

A mobile receiver of the present invention which comprises memory means for storing therein receive frequency data and broadcasting station name data associated therewith with respect to respecitve areas, receivable/non-receivable decision means for determining broadcasting frequencies receivable at the current position, and means for comparing ones of the receive frequency data corresponding to one of the areas designated at operating means or ones of the receive frequency data corresponding to an automatically determined area with the receive frequency data stored in the memory means and for presenting one of the broadcasting station name data of the receive frequency at which the receiver is now receiving, whereby the user of the mobile receiver can advantageously know easily the name of one of broadcasting stations of the same broadcasting frequency located in different areas, to which the user is listening.

6 Claims, 5 Drawing Sheets

MOBILE RECEIVER

BACKGROUND OF THE INVENTION

The present invention generally relates to car radio receivers and, more particularly, to a mobile receiver such as a portable radio receiver.

At present, many radio broadcasting station are located in various areas, and some of the broadcasting stations located in different areas also transmit different broadcasting electromagnetic waves having an identical broadcasting frequency. In particular, in the U.S.A., there are many groups of such broadcasting stations that are located in adjacent areas and transmit different broadcasting electromagnetic waves having an identical frequency. For this reason, when receiving a radio broadcast via a radio receiver mounted on a moving vehicle, a user can listen to different broadcasts having an identical frequency in different areas. However, it is sometimes difficult to discriminate or know the listening broadcast station. For example, when the vehicle having the receiver mounted thereon is running in an area A while receiving a broadcast from a station a having a broadcasting frequency $f_1$ and enters into an area B, the receiver can receive another broadcast b which has the same frequency $f_1$ but is different from the broadcast a in which case the listener sometimes cannot grasp or discriminate the name of the broadcasting station of the broadcast b.

SUMMARY OF THE INVENTION

It is an object of the present invention to provide a mobile receiver which allows easy discrimination of the broadcasting station name of a broadcast received during transfer of the receiver.

According to the present invention, the name of one of plural broadcasting stations of the same broadcasting frequency located in different areas, may be advantageously known.

DESCRIPTION OF THE PREFERRED EMBODIMENTS

Figure 1:
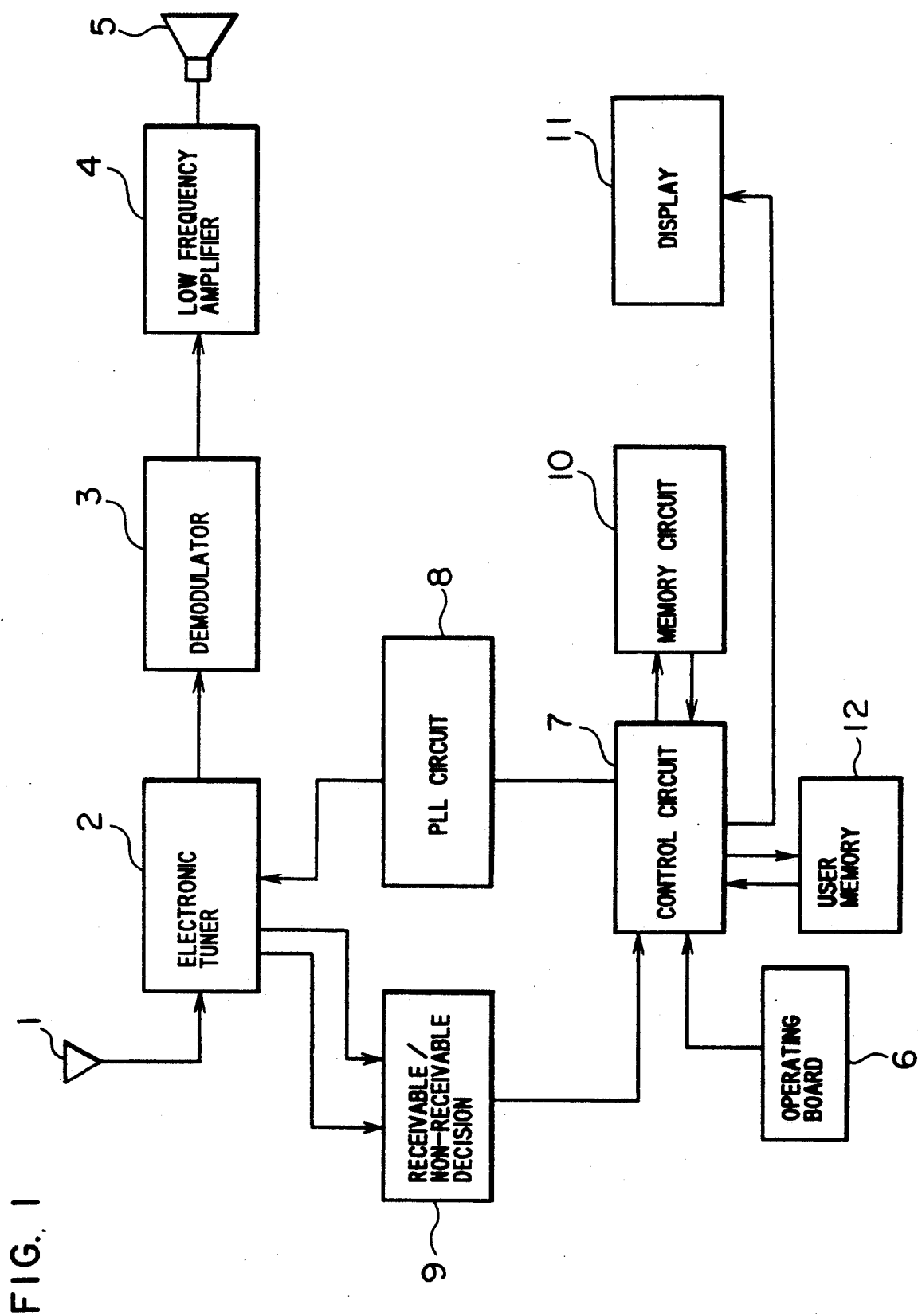
FIG. 1 is a block diagram of a mobile receiver in accordance with an embodiment of the present invention.
Figures 2, 3:
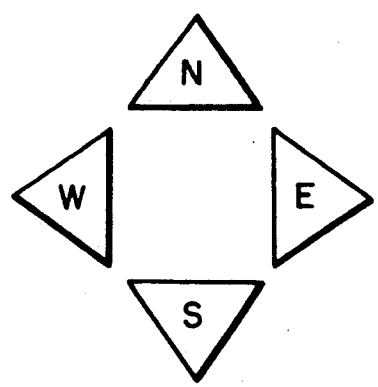
FIG. 2 shows an area selection key of the same receiver.
FIG. 3 shows area divisions.

Embodiments of the present invention will be explained by referring to FIGS. 1 to 4. These embodiments are intended to be used as radio receivers to be mounted on vehicles. A radio receiver of FIG. 1 as the first embodiment includes an antenna 1; an electronic tuner 2 having a high frequency amplifier, a mixer, a local oscillator, an intermediate frequency amplifier and so on; a demodulation circuit 3; a low frequency amplification circuit 4; a loudspeaker 5; and an operating board 6 having various keys including a preset key, a sweeping key, area selection keys, and so on. More specifically, the area selection keys, as shown in FIG. 2, include a key "N" indicative of North direction, a key "S" indicative of South, a key "E" indicative of East, and a key "W" indicative of West. The illustrated radio receiver further includes a control circuit 7, a PLL circuit 8, a receivable/non-receivable decision circuit 9, and a memory circuit 10. The control circuit is used to control the PLL circuit 8, memory circuit 10, receivable/non-receivable decision circuit 9 and so on in response to an operation of the operation board 6. The PLL circuit 8 is provided, in response to a control signal received from the control circuit 7, to set a predetermined receive frequency at the electronic tuner 2. More particularly, when the preset key of the operating board 6 is operated, this causes the PLL circuit 8 to set the electronic tuner 21 at a receive frequency selected at the preset key; while, when the sweeping key is operated, this causes the PLL circuit to sequentially change the receive frequency to be set at the electronic tuner 2. The receivable/non-receivable decision circuit 9 functions to judge whether or not the AGC output level of the electronic tuner 2 is higher than a predetermined value and also whether or not the IF (intermediate frequency) output of the tuner coincides with a predetermined level, and to output the decision result to the control circuit 7. If the receive frequency is set at, for example, $f_1$ and it is determined by the receivable/non-receivable decision circuit 9 that the AGC output level is higher than the predetermined value and the IF output thereof coincides with the predetermined level, this means that the radio receiver can receive at the current location a broadcast having the receive frequency $f_1$ from a broadcasting station. The memory circuit is used to previously store therein frequency data of receivable broadcasting stations and broadcasting station names associated therewith with respect to different areas. The radio receiver of FIG. 1 also includes a display 11 which indicates thereon the receive frequency, broadcasting station name, area name (A, B, C, . . . or X) and so on. Further included in the receiver is a user memory 12 which previously stores therein, when a new broadcasting station is opened, the corresponding area name, broadcasting station name, receive frequency and so on through intervention of the user. When the receiver area is changed, the data stored in the memory circuit 10 and the data stored in the user memory 12 are utilized.

FIG. 3 shows an example of the area divisions in the one of states in U.S.A., in which the frequencies of broadcasting stations receivable in areas A, B, C, . . . X are as shown in the Table below and it is assumed that the receiver can receive different broadcasts of the same frequency $f_1$ from different broadcasting stations in the areas A, B, E and X.

| AREA NAME | RECEIVABLE FREQUENCY |
| --- | --- |
| A | $f_1, f_2, f_3, f_4, \ldots$ |
| B | $f_1, f_5, f_6, f_7, \ldots$ |
| C | $f_8, f_9, f_{10}, f_{11}, \ldots$ |
| D | $f_{12}, f_{13}, f_{14}, f_{15}, \ldots$ |
| E | $f_1, f_{16}, f_{17}, f_{18} \ldots$ |
| F | $f_{19}, f_{20}, f_{21}, f_{22}, \ldots$ |
| G | $f_{23}, f_{24}, f_{25}, f_{26}, \ldots$ |
| H | $f_{27}, f_{28}, f_{29}, f_{30}, \ldots$ |
| X | $f_1, f_{31}, f_{32}, f_{33}, \ldots$ |
| ... | ... |

The frequencies receivable in the above areas as well as the broadcasting name data associated therewith are stored in the memory circuit 10.

In the present embodiment, receive frequencies determined as receivable by the receivable/non-receivable decision circuit 9 at the current position are compared with receivable frequency data of the respective areas previously stored in the memory circuit 10, so that the name of the broadcasting station being received at the current position is read out from the memory circuit 10, whereby the read station name and the associated area name (A, B, C, D, ... or X) of the current position are indicated on the display 11.

Explanation will be made as to the operation of the present embodiment. Assume now that a car carried therein with a radio receiver as shown in FIG. 1 is running in the area X in FIG. 3 while receiving a broadcast from the broadcasting station a of the frequency $f_1$. Then, the area name X is indicated on the display 11, together with the associated receive frequency $f_1$ and broadcasting station name. When the car runs north of the area X therefrom and enters into the area B, the receiver can receive another broadcast having the frequency $f_1$ but cannot know its broadcasting station name. In this case, when the user pushes the area selection key "N" (north) shown in FIG. 2, this results in read out of the data of the area B, i.e., the frequency data of the broadcasting stations in the area B and the associated broadcasting station name data, from the memory circuit 10 and then setting of this data in the control circuit 7. The receivable/non-receivable decision circuit 9 judges whether or not the AGC output of the frequency $f_1$ now being received is higher than the predetermined value and also whether or not the IF output coincides with the predetermined level. Since the receiver can receive the broadcast of the frequency $f_1$ in the area B, the decision circuit 9 determines both to be "YES" and issues the determined result to the control circuit 7. In the control circuit 7, the receivable frequency data of the area B read out from the memory circuit 10 are compared with the frequency $f_1$ of the broadcast now being received to retrieve the broadcasting station name b of the frequency $f_1$ in the area B. The retrieved broadcasting station name data b is sent from the control circuit 7 to the display 11 to be indicated thereon.

Figure 4:
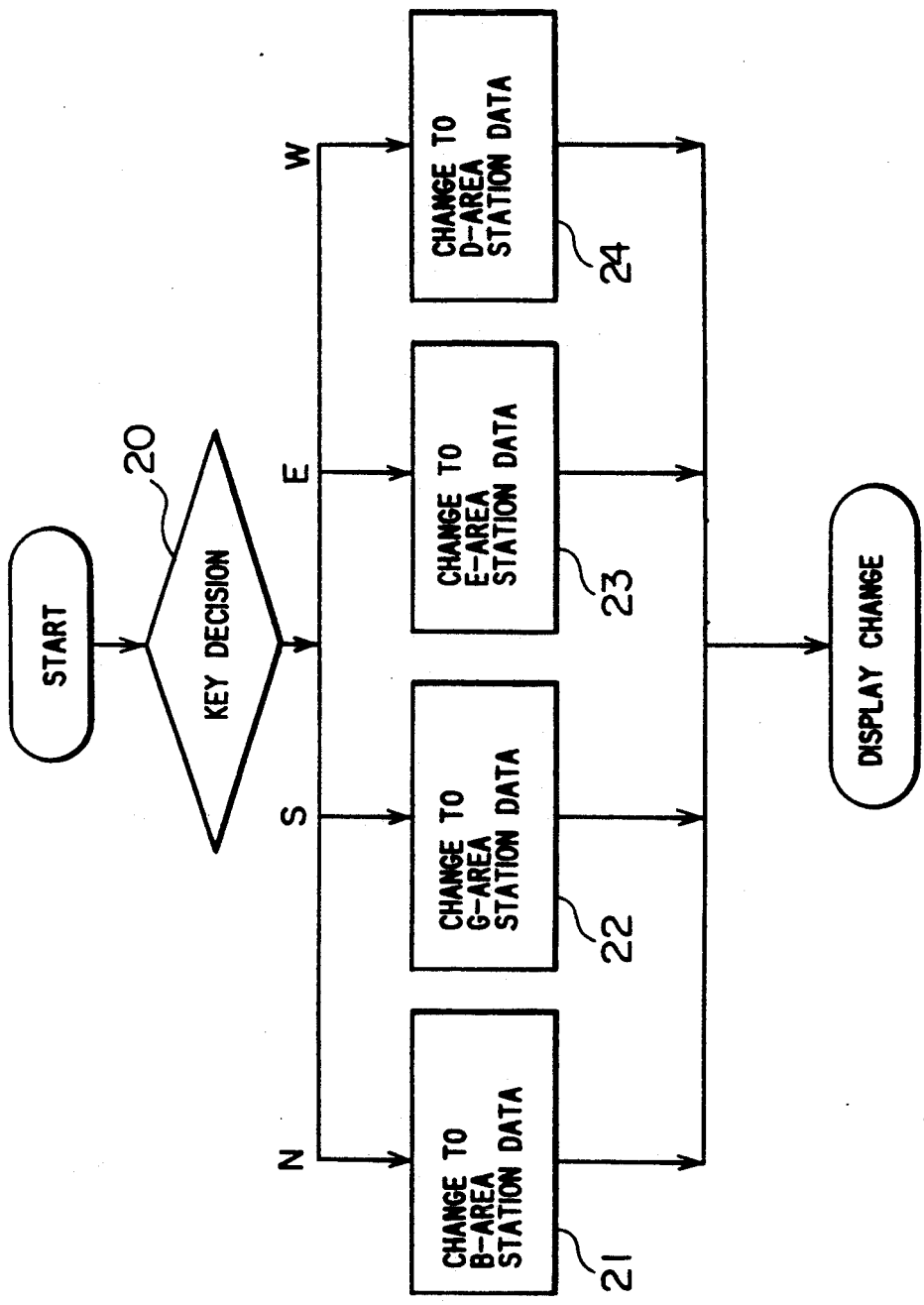
FIG. 4 shows a flowchart for explaining the operation of the same receiver.

Shown in FIG. 4 is a flowchart for explaining the above broadcasting station name selection operation. More specifically, one of the area selection keys "N", "S", "E" and "W" operated at the operating board 6 is judged at a step 20. On the basis of the determined result, at steps 21, 22, 23 and 24, the data of the corresponding area is read out from the memory circuit 10 and set at the control circuit 7 to thereby change the indication of the area name and receiving-broadcast station name on the display 11.

In this way, only user's pushing operation of the area selection key indicative of the moved direction enables the realization of indication of the broadcasting station name received at the moved location. In this connection, in place of indicating the receiving-broadcast station name on the display, the station name may be announced to the user in the form of a composite tone.

When the user wishes to designate a direction northeast, he is only required to depress the area selection key "N" and then the key "E".

In this way, the present embodiment has an advantage such that only the user's designation of the moved direction enables the radio receiver to present the receiving-broadcast station name to the user.

Explanation will next be made as to a second embodiment of the present invention with reference to FIGS. 5 and 6. The present embodiment, like the first embodiment, is intended to be used as a radio receiver to be mounted on a car. The radio receiver of FIG. 5 includes an antenna 51; an electronic tuner 52 having a high frequency amplifier, a mixer, a local oscillator, an intermediate frequency amplifier, and so on; a demodulation circuit 53; a low frequency amplification circuit 54; and a loudspeaker 55. The illustrated ratio receiver further includes an operating board 56, a control circuit 57, a PLL circuit 58, a memory circuit 60, a receivable/non-receivable decision circuit 59, and a receive area decision circuit 61. The operating board 56 has various keys including a preset key, a sweeping key, area selection keys and so on. The control circuit 57 functions, in response to an operation of the operating board 56, to control the PLL circuit 58, memory circuit 60, receivable/non-receivable decision circuit 59, receive-area decision circuit 61 and so on. When the preset key of the operating board 56 is operated, this causes the PLL circuit 58 to set a receive frequency selected at the preset key at the electronic tuner 52; whereas, when the sweeping key is operated, this causes the receive frequency set at the electronic tuner 52 to be sequentially changed. The receivable/non-receivable decision circuit 59 functions to determine whether or not the AGC output level of the electronic tuner 52 is higher than a predetermined value and also whether or not the IF output thereof coincides with a predetermined level, and outputs its determined result to the control circuit 57. In the event that the PLL circuit 58 causes the receive frequency, for example, $f_1$ to be set at the electronic tuner 52 and the receivable/non-receivable decision circuit 59 determines the AGC output level to be higher than the predetermined value and also detects a coincidence between the IF output and the predetermined level, this means that the radio receiver can receive the broadcasting station of the receive frequency $f_1$. The memory circuit 60 previously stores therein frequencies of broadcasting stations receivable in respective areas and the associated broadcasting station data. The receive-area decision circuit 61 compares the receive frequencies determined as receivable at the receivable/non-receivable decision circuit 59 with the receive frequency data previously stored in the memory circuit 60 to determine the area in which the radio receiver is now located. A display 62 indicates thereon the associated receive frequency, area name (A, B, C, . . . X) and so on. A user memory 63 is used, when a new broadcasting station is opened, to previously store therein the associated area name, receive frequency, broadcasting station and the like through the user's intervention. The data stored in the memory circuit 60 and the data stored in the user memory 63 are utilized to determine the area. Previously stored in the memory circuit 60 are the receive frequency receivable in the respective areas and the associated broadcasting station name data.

In the present embodiment, the receive frequencies determined as receivable by the receivable/non-receivable decision circuit 59 at the current position are compared with the receivable frequencies of the respective areas stored in the memory circuit 60 to determine one of the areas belonging to the current location of the radio receiver, and the receive frequency is indicated on the display 62 together with the area name (A, B, C, . . . X) and broadcasting station name associated with the current position.

The operation of the present embodiment will be explained by referring to FIG. 6. Assume now that a car mounted thereon with a radio receiver as shown in FIG. 5 is running while receiving the broadcast of the frequency $f_1$ and then moves from the area X into another area but the broadcasting station name is unknown to the user. When the user depresses an associated one of the area selection keys of the operating board 56, this causes the radio receiver to be put in its area decision mode. In this mode, as shown in FIG. 6, the PLL circuit 58 causes the receive frequency set at the electronic tuner 52 to be sequentially increased in predetermined increments from the lowest receive frequency (step 70). The receivable/non-receivable decision circuit 59 determines whether or not the AGC output of each receive frequency set at the electronic tuner 52 is higher than the predetermined value (step 71) and also whether or not the IF output thereof coincides with the predetermined level (step 72), and then outputs the determined result to the control circuit 57. When the receive frequency set at the electronic tuner 52 is sequentially changed from the lowest receive frequency to the highest one, this causes the receivable/non-receivable decision circuit 59 to determine the receive frequencies receivable at the current position and the determined result is stored in the control circuit 57 (step 73). When it is determined at a step 74 that the set receive frequency has been changed up to the highest frequency, the receive frequency data of the respective areas stored in the memory circuit 60 are read out from the memory circuit 60, and then transferred to the receive-area decision circuit 61 at a step 75. At a step 76, the receivable frequency data of the current position being stored in the control circuit 57 is transferred to the receive-area decision circuit 61. The circuit 61 in turn compares the receivable frequency data of the current position transferred from the control circuit 57 with the receivable frequency data of the respective areas read out from the memory circuit 60 to determine one of the areas (A, B, C, D, . . . ) in which the radio receiver is not positioned (step 77). This area determination is carried out, for example, by determining one of the areas which has the largest number of coincidences between the receivable frequencies of the current position and the receivable frequencies of the respective areas read out from the memory circuit 60 (step 77). For example, in the case where the radio receiver is moved out of the area X and thereafter the aforementioned area decision operation is carried out, if it is assumed that the radio receiver determines via the receivable/non-receivable decision circuit 59 that it is able to receive the frequencies $f_1$, $f_5$, $f_6$, $f_7$, . . . at the current position, then the number of coincidences between the receivable frequencies of the current position and the receivable frequencies of the respective areas read out from the memory circuit 60 becomes highest for the area B and thus the current position is determined to be in the area B. In this manner, the current position is determined at a step 77 to be in the area B. The old receive area data on the display 62 is changed at a step 78 and instead the new broadcasting station name determined on the basis of the broadcasting station name data of the area B stored in the memory circuit 60 is indicated on the display 62 (step 79). When it is determined at the step 77 that there is no coincidence area, on the other hand, the receivable frequency data stored in the control circuit 57 at the step 78 is compared at a step 80 with the receivable frequency data of the area X stored in the memory circuit 60 to determine at a step 81 a coincidence or non-coincidence therebetween. When the determined result is a coincidence, this means that the radio receiver is moving but is still in the area X and thus continuously utilizes at a step 82 the current receiver area data, i.e., the receive frequency data, broadcasting station name data and so on of the area X. When a non-coincidence is determined at the step 81, this means that the current position is not in the area A, B, C, D, E, F, G, H or X, and thus the radio receiver demands at a step 83 the user to set an area outside such areas as shown in FIG. 3. At this stage, the radio receiver completes its area decision mode.

As has been explained in the foregoing, in accordance with the present embodiment, even in the event where different broadcasting stations of the same receive frequency $f_1$ are located in adjacent areas, a user's pushing operation of the area selection key enables the automatic discrimination of the current area and also the indication of the associated broadcasting station name of the frequency $f_1$ on the display 62 on the basis of the broadcasting station data on the discriminated area. Accordingly, the user can know the name of the broadcasting station to which the user is now listening. In addition, although the receive broadcasting station name of the discriminated area has been indicated on the display 62 in the foregoing embodiments, the receive broadcasting station name may be announced to the user in the form of a composite tone or voice.

Figure 5:
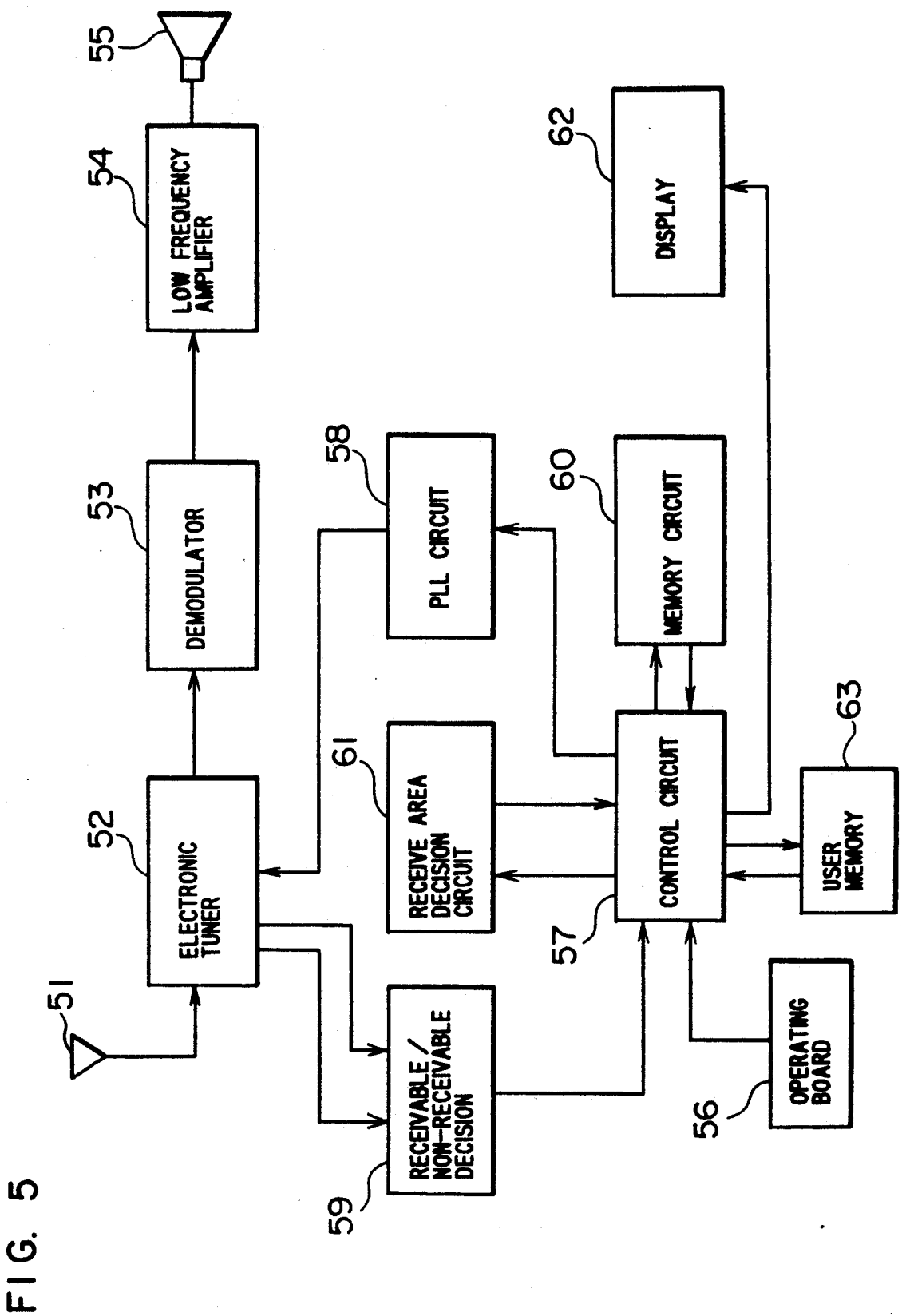
FIG. 5 is a block diagram in accordance with a second embodiment of the present invention.
Figure 6:
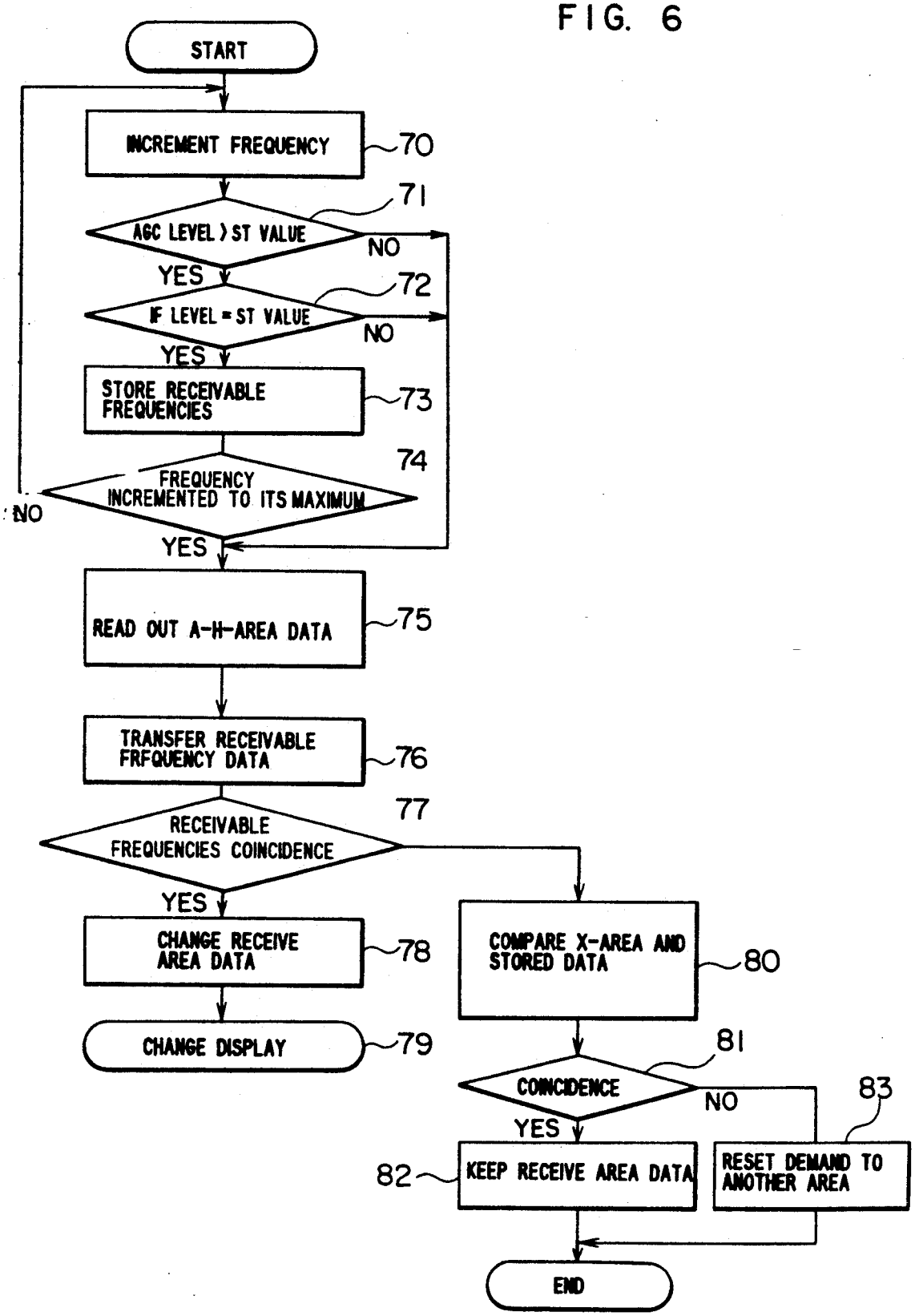
FIG. 6 is a flowchart for explaining the operation of the same receiver.

In this way, the embodiment shown in FIG. 5 has an advantage that, even in the case where a plurality of broadcasting stations of the same broadcasting frequency are located in mutually different areas, the radio receiver of the embodiment can automatically discriminate the area name of the current position of the radio receiver and present the name of the broadcasting station to which the user is listening.

What is claimed is:

1. A mobile receiver comprising:
   an operating means having an input for inputting a travel direction of the receiver;
   memory means for storing therein receive frequency data and broadcasting station name data associated therewith with respect to respective geographic areas;
   read out means for reading out from said memory means receive frequency data relating to a designated area corresponding to said travel direction of the receiver designated by said operating means and broadcasting station name data associated therewith;
   receivable/non-receivable decision means for determining broadcasting frequencies receivable at a current position of the receiver; and
   means for (a) comparing receive frequency data determined as receivable by said receivable/non-receivable decision means with said receive frequency data of said designated area read out from said memory means, (b) retrieving from said memory means receive broadcasting station name data corresponding to one broadcasting station in said designated area and (c) providing an output identifying said one broadcasting station.

2. A mobile receiver as set forth in claim 1, wherein said input of said operating means comprises an area selection key.

3. A mobile as set forth in claim 1, wherein said output identifying said one broadcasting station is presented in the form of a composite voice.

4. A mobile receiver comprising:

memory means for storing therein receive frequency data and broadcasting station name data associated therewith with respect to respective geographic areas;

receivable/non-receivable decision means for determining broadcasting frequencies receivable at a current position of the receiver;

receive area decision means for performing a comparison operation with respect to receive frequency data determined as receivable by said receivable/non-receivable decision means with said receive frequency data stored in said memory means to determine one of said areas corresponding to said current position of the receiver; and means for determining one of said broadcasting station name data associated with said receive frequency data corresponding to said one of said areas determined by said receive area decision means among said frequency data and said broadcasting station name data stored in said memory means and for providing an output identifying said one of said broadcasting station name data.

5. A mobile receiver as set forth in claim 4, wherein said receive area decision means, based upon said comparison operation, determines a number of coincidences between receive frequencies determined as receivable by said receivable/non-receivable decision means and receive frequencies corresponding to receive frequency data of respective geographic areas stored in said memory means and, based on said number of coincidences, determines said one of said areas corresponding to said current position of the receiver.

6. A mobile receiver as set forth in claim 4, wherein said said output representing said one broadcasting station name data is presented in the form of a composite voice.

* * * * *